Sept. 7, 1943.  C. E. GARDNER  2,328,798
METHOD OF LINING
Filed June 13, 1940  2 Sheets-Sheet 1

Inventor
Charles E. Gardner
By
Attorney

Patented Sept. 7, 1943

2,328,798

UNITED STATES PATENT OFFICE 2,328,798

METHOD OF LINING

Charles E. Gardner, Cuyahoga Falls, Ohio, assignor to Wingfoot Corporation, Akron, Ohio, a corporation of Delaware Application June 13, 1940, Serial No. 340,280

2 Claims. (Cl. 18—56)

This invention relates to a lining for a container, such as a carton or the like. A thermostretchable film is used. By "thermostretchable" is meant the ability to be stretched when heated.

There have been recently introduced on the market thermostretchable sheeting materials, such as sheets of rubber hydrochloride and the like. It is known that such materials can be stretched particularly when heated, and the use of this phenomenon in packaging is not altogether new. However, so far as I am aware stretchability of such film, particularly when heated, has not heretofore been used in lining cartons and like packages.

According to this invention one uses a thin flat film of a thermoplastic material which when heated can be stretched and which on subsequent cooling, retains the stretched condition. Such film is gripped at the edges, and the center portion is stretched into a carton or similar container, and it is stretched to conform to the interior of the container, thereby forming a seamless lining. If a square or oblong carton is lined the lining will be stretched to conform to five of the carton's walls. The sixth wall may be covered by folding in the edges of the film which have not been stretched, at least to the extent to which the center portion of the film is stretched. The preferred material for the formation of such a lining is a rubber hydrochloride film such, for example, as the material now manufactured by The Goodyear Tire & Rubber Company and sold as "Pliofilm" rubber hydrochloride sheet. Other satisfactory thermostretchable materials include vinyl derivatives, cellulosic derivatives, etc., suitably plasticized, if necessary and desirable.

The invention will be further described in connection with the accompanying drawings in which the lining of a cardboard carton with rubber hydrochloride film is illustrated.

Figure 1:
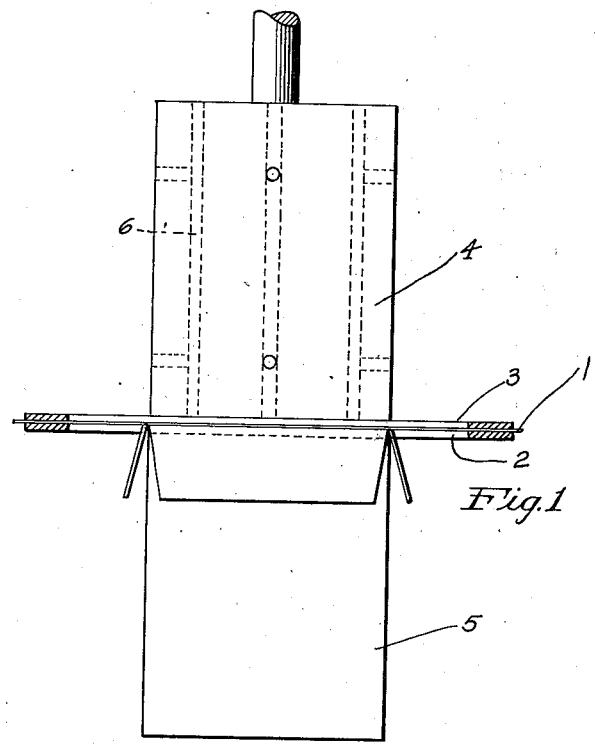
Figure 2:
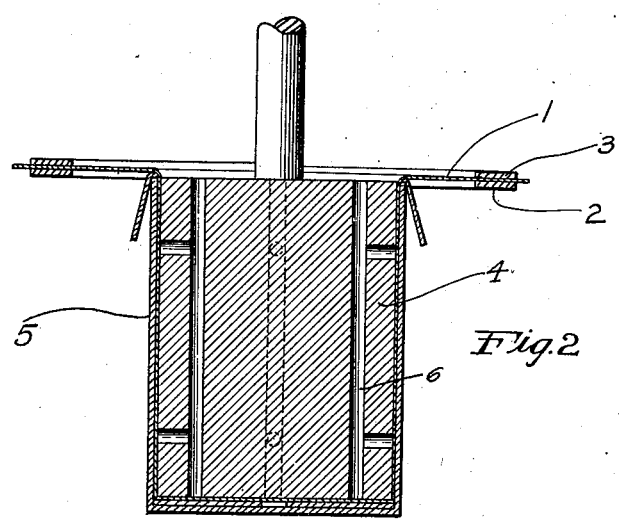
Figure 3:
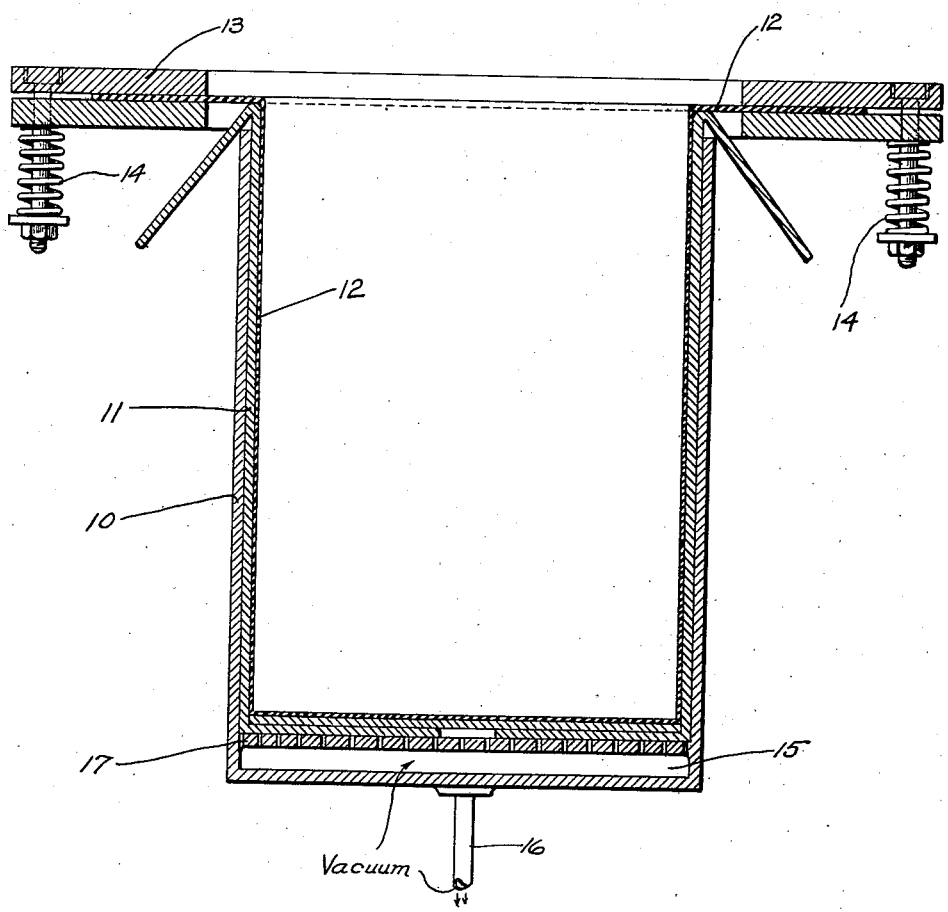

In the drawings, Fig. 1 shows a view of a carton with the film stretched over its top and a plunger in position to fit the film into the interior of the carton. Fig. 2 is a view in section showing the plunger lowered and the film stretched to fit the interior of the carton. Fig. 3 shows means for accomplishing the same result by vacuum.

The film 1 is a sheet of unplasticized rubber hydrochloride film about .001 inch thick. It is firmly grasped around its perimeter between the clamps 2 and 3. The film is somewhat larger than that required to cover the top of the carton. This allows some excess film to cover over the top of the carton after the interior has been lined.

The clamps 2 and 3 may be held together by any mechanical device which will hold the edges of the film without slipping. The clamps may comprise a tongue and groove running throughout their length to grip the film.

The film may be heated in any one of various ways. It may be heated by a hot blast of air or by being placed over or near a source of heat. It may be heated before or after it is clamped in place. For example, a heated metal plate may be lowered into close proximity with the film after the film has been clamped in position. Heat radiated from the metal will raise the film to the desired temperature in a very short time. The portion of the film held by the clamps is not heated by this method, and this may be advantageous. The film is heated to 160–220° F. or thereabouts prior to stretching. Platens reaching a temperature as high as 325° F. may be used. A preferred method of operation is to withdraw the film from a roll of the required width and clamp it between the clamps and then heat it. The lining is then formed by stretching the film into the carton. The clamps are released after the film has cooled. The border of film which has been held by the clamps is then released. It may be trimmed off or it may later be used to fold over the contents of the carton. Another length of film is then drawn off the roll and the operation is repeated with a different carton.

If the heat is applied by a plate lowered to within a short distance of the film, there must be sufficient clearance for the heating plate to be inserted under the plunger 4. In this case the plunger will be raised to a greater extent than is shown in Fig. 1. The carton 5 may be of any desired size and shape. It is placed directly under the plunger. Then after the film is heated the plunger is lowered into the carton. This, of course, stretches the film so that the film conforms to the walls of the carton as shown in Fig. 2. The plunger is then withdrawn. The air channels 6 permit the entrance of air into the carton when the plunger is withdrawn. In order to cool the film and keep the lining in place, it may be desirable to blow air through channels such as those indicated by the numeral 6, preferably with openings only at the bottom of the plunger. Or the film may be held in position within the carton by placing the carton or perhaps only the bottom portion of the carton in a vacuum chamber and applying sufficient vacuum to hold the film in place. The bottom of a carton ordinarily is not vacuum-tight, and placing the carton in a vacuum chamber will create sufficient suction within the carton to hold the film in place.

It is not necessary to use a plunger in carrying out this operation. Air may be used to blow the film into the carton or the entire carton may be placed under a vacuum so as to suck the film and stretch it into place.

The vacuum apparatus shown in Fig. 3 comprises a vessel 10 which just holds the carton 11. The film 12, before stretching is held taut over the mouth of the carton by the clamps 13. The clamps are forced together by the coil springs 14. In the bottom of the vessel is a vacuum chamber 15 which is connected to a vacuum pump (not shown) by the pipe 16. The vacuum chamber is connected with the rest of the vessel by the perforated wall 17.

To operate, the film, after heating, may be drawn down into the carton by vacuum alone, or a plunger or similar device may be used to aid in stretching the film to line the carton. The walls of the carton are not vacuum-tight, and the vacuum has to operate through them. In view of this it may generally be desirable to aid the vacuum in stretching the film by using a plunger or similar means to start the stretching of the film. The vacuum may be maintained while the film cools, and even till the package is filled if this is desirable. It may be desirable where the package is to be filled with hot lard or other material which is sufficiently hot to cause the stretched film to shrink.

The invention is applicable to the lining of a cylindrical vessel or a square or oblong vessel or a vessel of any shape. The lining may be of any desired material for the packaging of greasy or oily material. A lining of rubber hydrochloride film is preferred. For example, in forming pound packages of lard, a carton the shape of that now employed for a pound of butter may be used, the carton being first lined with the rubber hydrochloride film and then filled with the lard in molten condition.

As stretched rubber hydrochloride film contracts on heating, film which has been stretched to form a lining must not be again heated, unless vacuum or other means is provided to prevent shrinkage. On heating to 130° C. such film will lose its stretch and again become a perfectly flat sheet. The film which is to be stretched may be dyed or colored with pigment and may contain fillers, etc., as desired. Instead of making one liner at a time, a plurality of cartons may be lined simultaneously by heating a relatively large sheet of the thermostretchable material and placing it over a plurality of cartons and then forming liners in each of these cartons simultaneously. In this case, it is not necessary to grip the film around each individual carton but a relatively large sheet of film may be suitably held in place and the area thus enclosed may be used to form a plurality of linings simultaneously.

I claim:

1. The method of lining a carton or the like which comprises covering the mouth of the carton with a heated flexible film of thermostretchable material then stretching the film to form a flexible, seamless liner fitting the interior contour of the carton by drawing said film to the bottom of the carton and shaping it into intimate contact with the carton side and bottom wall surfaces by vacuum, and setting the film liner in its so stretched and shaped condition.

2. The step in the process of stretching a heated flexible film of thermostretchable material to form a flexible, fitted and seamless, lining for the walls of a carton which comprises stretching and drawing the heated film into intimate filling contact with a wall of the carton by evacuating the air from between the film and the wall of the carton.

CHARLES E. GARDNER.

CERTIFICATE OF CORRECTION.

Patent No. 2,328,798. September 7, 1943.

CHARLES E. GARDNER.

It is hereby certified that error appears in the printed specification of the above numbered patent requiring correction as follows: Page 1, first column, line 1, before the word "lining" insert --method of--; same line, after "lining" strike out "for"; and that the said Letters Patent should be read with this correction therein that the same may conform to the record of the case in the Patent Office.

Signed and sealed this 30th day of November, A. D. 1943.

(Seal)

Henry Van Arsdale,
Acting Commissioner of Patents.